US009646654B2

(12) United States Patent
Pajouh

(10) Patent No.: US 9,646,654 B2
(45) Date of Patent: May 9, 2017

(54) SYNCHRONIZATION OF EVENTS AND AUDIO OR VIDEO CONTENT DURING RECORDING AND PLAYBACK OF MULTIMEDIA CONTENT ITEMS

(71) Applicant: Darius Vahdat Pajouh, Hagen (DE)

(72) Inventor: Darius Vahdat Pajouh, Hagen (DE)

(*) Notice: Subject to any disclaimer, the term of this patent is extended or adjusted under 35 U.S.C. 154(b) by 309 days.

(21) Appl. No.: 14/034,105

(22) Filed: Sep. 23, 2013

(65) Prior Publication Data
US 2015/0086172 A1 Mar. 26, 2015

(51) Int. Cl.
| H04N 5/932 | (2006.01) |
| G11B 27/11 | (2006.01) |
| G11B 27/36 | (2006.01) |
| G11B 31/00 | (2006.01) |
| H04N 9/802 | (2006.01) |
| H04N 9/87 | (2006.01) |
| H04N 21/262 | (2011.01) |
| H04N 21/43 | (2011.01) |
| H04N 21/442 | (2011.01) |
| H04N 21/8545 | (2011.01) |
| H04N 21/8547 | (2011.01) |

(52) U.S. Cl.
CPC ............. *G11B 27/11* (2013.01); *G11B 27/36* (2013.01); *G11B 31/006* (2013.01); *H04N 9/802* (2013.01); *H04N 9/8715* (2013.01); *H04N 21/26258* (2013.01); *H04N 21/4307* (2013.01); *H04N 21/44222* (2013.01); *H04N 21/8545* (2013.01); *H04N 21/8547* (2013.01)

(58) Field of Classification Search
CPC .................................. G11B 27/11; G11B 27/36
USPC .................. 386/201, 239, 321–323, 326, 353
See application file for complete search history.

(56) References Cited

U.S. PATENT DOCUMENTS

| 5,437,014 A * | 7/1995 | Busboom ................ G06F 3/038 345/163 |
| 2002/0009285 A1 * | 1/2002 | Safadi .................. H04N 5/4401 386/295 |

(Continued)

FOREIGN PATENT DOCUMENTS

WO    WO2013041955 A3    8/2013

OTHER PUBLICATIONS

Authorized Officer Karin Exner, International Search Report/Written Opinion in PCT/EP2014/070227 mailed Dec. 12, 2014, 12 pages.

*Primary Examiner* — Thai Tran
*Assistant Examiner* — Mishawn Hunter
(74) *Attorney, Agent, or Firm* — Fish & Richardson P.C.

(57) ABSTRACT

A computer-implemented method for simultaneously recording a media recording and an event recording includes recording a media recording, recording an event recording simultaneously with the media recording, the event recording encoding a plurality of events, an event being related to one or more user interactions with an input device associated with the media recording and recording the event recording includes for each of a plurality of events of the event recording generating data characterizing the particular event and generating a corresponding time stamp for the particular event by polling a system time of a computer device at the time the particular event takes place, the method further includes providing the data characterizing the particular event and the corresponding time stamp for storage.

23 Claims, 5 Drawing Sheets

(56) References Cited

U.S. PATENT DOCUMENTS

| | | | |
|---|---|---|---|
| 2005/0213932 A1* | 9/2005 | Yuri | H04N 5/782 386/292 |
| 2008/0092050 A1 | 4/2008 | Wu | |
| 2010/0221694 A1* | 9/2010 | Moshenberg | G09B 7/04 434/362 |
| 2013/0322841 A1* | 12/2013 | Dolph | H04N 5/76 386/230 |

* cited by examiner

| time | x/y |
|------|-------|
| 0 | 17/17 |
| 50 | 105/17 |
| 100 | 115/19 |
| 150 | 114/19 |
| 200 | 115/18 |
| 250 | 115/19 |
| 300 | 119/260 |
| 350 | 120/261 |

| system time | relative system time |
|-------------|----------------------|
| ...765 | 0 |
| ...818 | 53 |
| ...872 | 107 |
| ...927 | 162 |
| ...980 | 215 |
| ...1031 | 266 |
| ...1185 | 420 |
| ...1268 | 503 |

SYNCHRONIZATION OF EVENTS AND AUDIO OR VIDEO CONTENT DURING RECORDING AND PLAYBACK OF MULTIMEDIA CONTENT ITEMS

BACKGROUND

High bandwidth internet connections allow distributing multimedia content all over the world. There exist platforms to simultaneously record an audio track and an event track, e.g., a trace of a pointer device. In this manner, a multimedia content item can be generated, e.g., a lecture to be distributed over the internet. When replaying this multimedia content item including a lecture, a set of slides can be presented synchronized with an audio recording including explanations and a trace of a pointer device for highlighting certain aspects on the slides. However, it can be difficult to record and replay the different recordings of a multimedia content item in a synchronous fashion.

SUMMARY

The methods and devices described relate to improved synchronization of events and audio or video content during recording and playback of multimedia content items.

In one aspect, a computer-implemented method for simultaneously recording a media recording and an event recording includes recording a media recording, recording an event recording simultaneously with the media recording, the event recording encoding a plurality of events, an event being related to one or more user interactions with an input device associated with the media recording and recording the event recording includes for each of a plurality of events of the event recording generating data characterizing the particular event and generating a corresponding time stamp for the particular event by polling a system time of a computer device at the time the particular event takes place, the method further includes providing the data characterizing the particular event and the corresponding time stamp for storage.

In another aspect, a computer-implemented method for synchronized replay of a media recording and an event recording includes obtaining a media recording and a corresponding event recording, the event recording encoding one or more events, an event characterizing one or more user interactions with an input device, the event recording including for each of a plurality of events data characterizing the particular event and a corresponding time stamp for the particular event generated by polling a system time of a computer device at the time the particular event took place, the method further includes replaying the media recording and replaying the events synchronized with the media recording, wherein a time when a particular event is replayed is determined by comparing the time stamp of the particular event with an elapsed time of the media recording.

In another aspect, a computer-implemented method for synchronized replay of a media recording and an event recording includes obtaining a media recording and a corresponding event recording, the event recording encoding one or more events, an event characterizing one or more user interactions with an input device and the event recording including for each of a plurality of events data characterizing the particular event and a corresponding time stamp for the particular event generated by polling a system time of a computer device at the time the particular event took place, the method for the including generating modified time stamps by aligning end points of the media recording and the even recording to determine an offset between the media recording and the even recording and correcting the time stamps by the determined offset.

By implementing the techniques described here, the synchronized replay of different recordings of a multimedia content item can be secured or improved. For instance, a multimedia content item can include an audio recording, a video recording, and/or an image recording track, generally referred to as a "media recording," and an event recording (e.g., encoding a trace of a pointer device over a presentation area). The techniques described here can facilitate playing back the media recording and the event recording in a synchronized manner over long periods of time (e.g., more than 30 minutes or even several hours) including a large number of events. For example, the falling out of synchronization of an audio recording and a trace of a pointer device that is rendered over a slideshow synchronized with the audio recording can be avoided so that the user experience is not severely impaired. This can allow to assemble even long multimedia content items from different separate parts including, e.g., audio or video recordings and an event recording. This, in turn, can lower memory and bandwidth requirements and improve the flexibility compared to combining all elements (e.g., a slideshow and a trace of a pointer device) in a single video data item.

BRIEF DESCRIPTION OF THE DRAWINGS

FIG. 4 shows tables including time stamp data and data characterizing events of an event recording.

Like reference numbers and designations in the various drawings indicate like elements.

DETAILED DESCRIPTION

Figure 1:
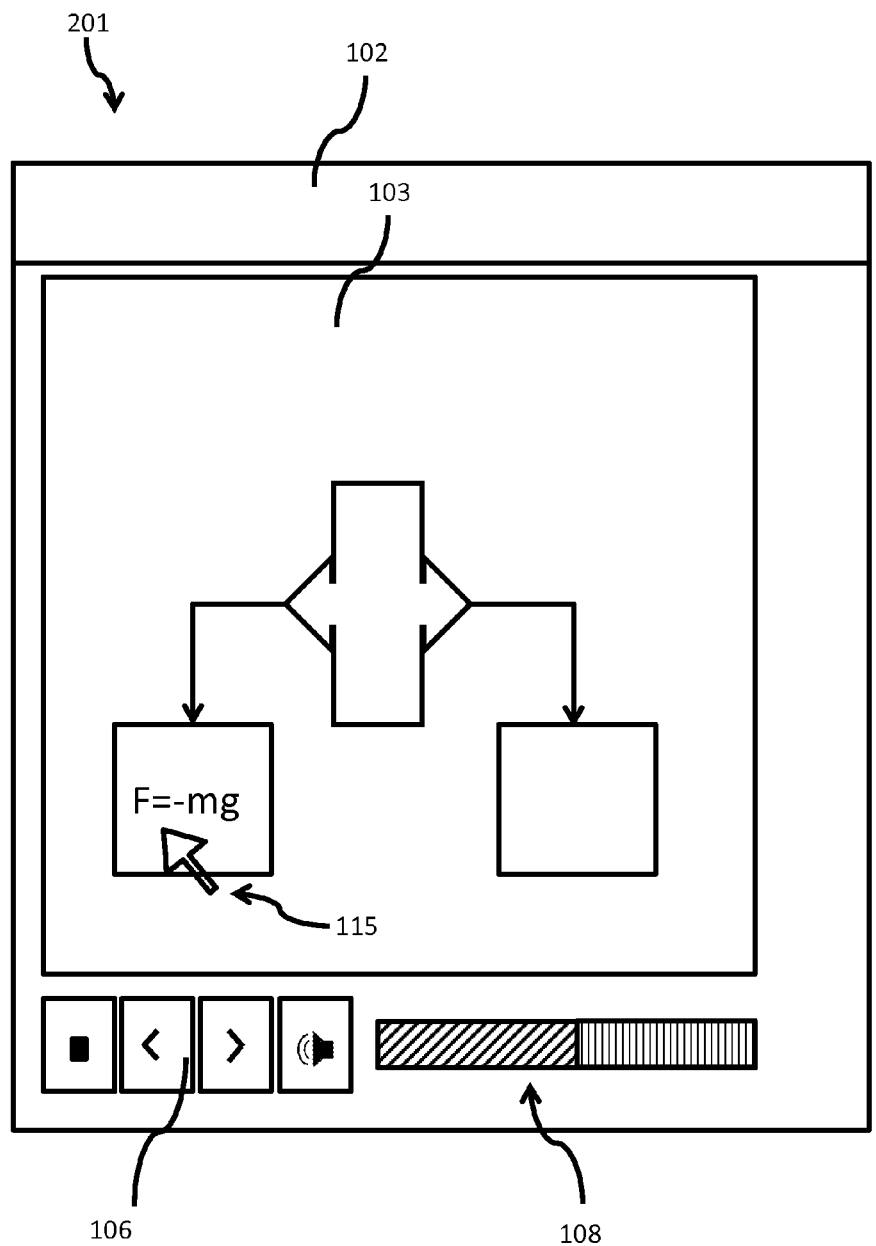
FIG. 1 shows a schematic screenshot of an application for recording multimedia content items at a first time during recording of a multimedia content item.

FIG. 1 shows a screenshot 101 of a computer application for recording multimedia content items. A multimedia content item includes a media recording including audio data, video and/or image data. The media recording can itself be separated into an audio recording including audio data and a video/image recording including still or moving images. For instance, a video/image recording can include a series of images in a predetermined order (e.g., a slide show of a presentation). In one example, the media recording includes a video/image recording including a slide show of a presentation and a corresponding audio recording. The media recording can, for example, be a recording of a commented slide-show.

Moreover, the multimedia content item includes an event recording. The event recording encodes one or more events relating one or more user interactions with an input device associated with the media recording by storing data characterizing the particular event and a time stamp for each event. During presentation of the multimedia content item, the one or more user interactions with an input device encoded in the event recording can be replayed. For instance, a graphic representation of the pointer device can be rendered and presented on top of the audio/video image recording replaying a trace of the pointer device of an author of the multimedia content item.

In some embodiments, the one or more user interactions with an input device can include movements of a pointer device and the data characterizing the particular event can include position data of the pointer device. In addition, or alternatively, the one or more user interactions with an input device can include zooming in or out in the video recording and the data characterizing the particular event can include data characterizing zoom operation. In addition or alternatively, the one or more user interactions with an input device can include triggering the execution of an application and the data characterizing the particular event can include data characterizing the executed application. In addition or alternatively, the one or more user interactions with an input device can include triggering moving forward or backward in a slideshow and the data characterizing the particular event can include data characterizing the change of slides. In one example, the event recording can encode a trace of a pointer device over a presentation by storing a set of positions of the pointer device. In this example, each event is related an incremental movement of the pointer device over the presentation field.

In the embodiment of FIG. 1, the multimedia content item is a commented slideshow. The multimedia content item includes an audio recording, a set of slides and an event recording encoding a trace of the mouse. Optionally, the event recording can encode events relating to moving forward or backward in the slideshow.

Subsequently, the synchronized recording and replay will be explained referring to the example multimedia item having an audio recording and an event recording. However, the techniques described here are not limited to synchronizing an audio recording and an event recording. Rather, the event recording can be recorded and replayed synchronous to any other recording. For example, an event recording can be synchronized with a video recording or a combined video and audio recording.

The screenshot of FIG. 1 includes a window 102 of an application for recording multimedia content items. The window 102 includes an area for displaying video or image data 103, an area for displaying control elements 106 and a progress bar 108 showing the progress of the presentation of the multimedia content item. In the example of FIG. 1, the area for displaying video or image data 103 is used to display a slide of a presentation. The control elements 106 include one control element for moving one or several slides forward and one control element for moving one or several slides backward. In addition, the control elements include one control element for starting and one for stopping simultaneous recording of an audio and event recording, or a combined control element for both functions.

The screenshot 101 of FIG. 1 shows the window 102 of the application for recording multimedia content items while an author records an audio recording including his or her explanations and, simultaneously, uses a mouse cursor 115 (or other pointer device) to highlight different parts of a current slide. The movement of the mouse cursor 115 is recorded in the event recording of the multimedia item. For example, the position of the mouse cursor can be stored periodically (e.g., at a frequency between 0.2/s and 120/s). The application for recording multimedia content items stores the position of the mouse cursor in the area for displaying video or image data 103 (e.g., an x-y coordinate pair or other suitable format to encode a position of the cursor). Thus, each event of the event recording in this embodiment relates to a position (or a movement) of a cursor. In addition, the application for recording multimedia content items polls a system time of a computer device at the time position of the mouse cursor 115 is determined. The respective system time is stored as a time stamp associated with the respective cursor position. Further details and alternative embodiments how the event data can be recorded are described below in connection with FIGS. 3 and 4.

System time is measured by a system clock of a computer device. The computer device times its applications with this system clock. Typically, system time is implemented as a simple count of the number of ticks that have transpired since some arbitrary starting date. For example, Unix and POSIX-compliant systems encode system time ("Unix time") as the number of milliseconds elapsed since the start of the Unix epoch at Jan. 1, 1970. 00:00:00 UT. Systems that implement the 32-bit and 64-bit versions of the Windows API, such as Windows 9x and Windows NT, provide the system time as both SYSTEMTIME, represented as a year/month/day/hour/minute/second/milliseconds value, and FILETIME, represented as a count of the number of 100-nanosecond ticks since 1 January 1601 00:00:00 UT as reckoned in the proleptic Gregorian calendar. These or any other system times can be employed in the techniques described here.

The application for recording the audio and the event recording can be a web-browser based application. For instance, the application can be a flash application. However, the techniques presented here are not limited to web-browser based applications. Rather, application for recording the audio and the event recording can also be executed in on-line environments other than web-browser environments and in off-line environments. For instance, the application for recording the audio and the event recording could be a program of a mobile device or locally executed on a personal computer.

The application for recording the audio and the event recording can be executed on any data processing apparatus ("computer device") described below. For example, the application for recording the audio and the event recording can be executed on a mobile device or desktop computer. The data processing apparatus for executing the application for recording the audio and the event recording can include a microphone, a camera, or both for recording a media recording and an input device. Examples for input devices are described below.

Figure 2:
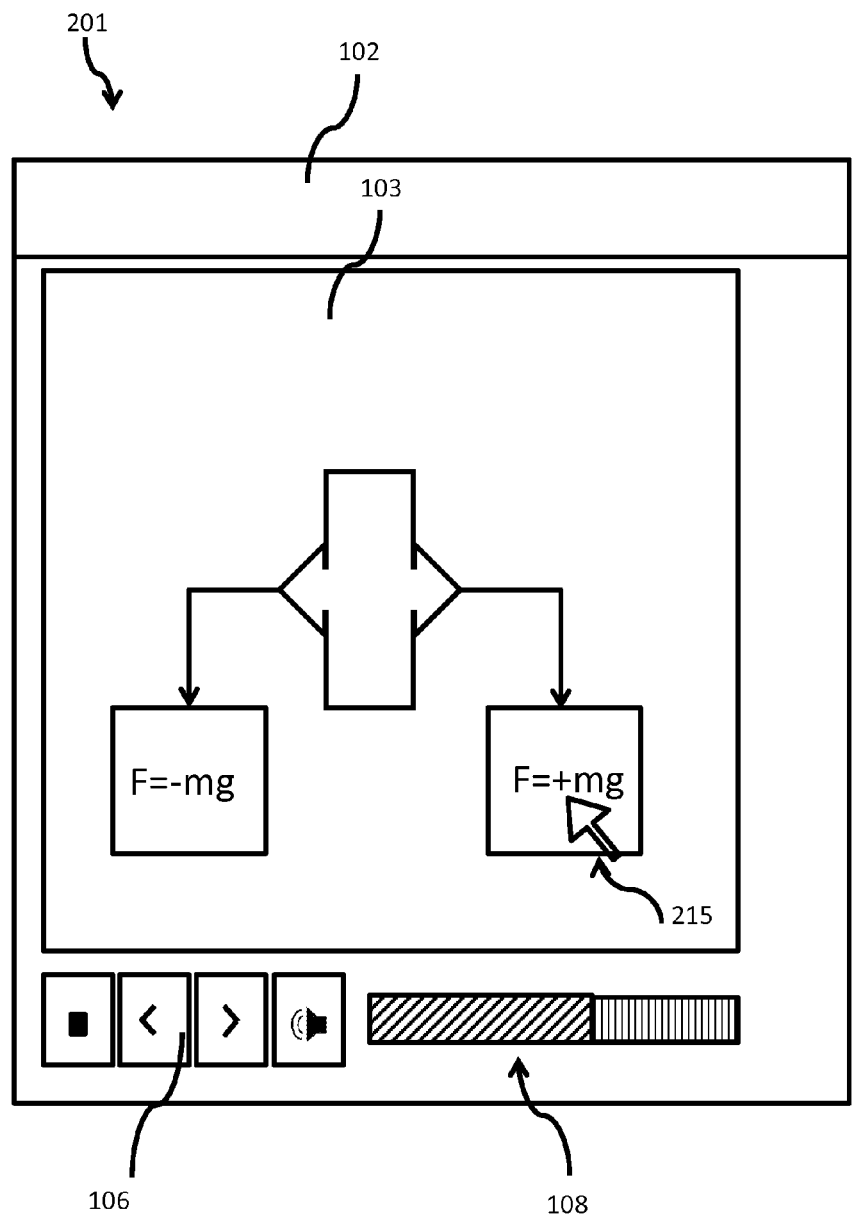
FIG. 2 shows a schematic screenshot of an application for recording multimedia content items at a second time during recording of a multimedia content item.

FIG. 2 shows a second screenshot 201 of the window 102 of the application for recording multimedia content items depicted in FIG. 1 a predetermined time after the first screenshot of FIG. 1. While the recording of the audio recording continues, the author has moved to a next slide and continues with highlighting aspects of the slide by moving the use cursor 215 over the area for displaying video or image data 103 of the window 102. The application for recording multimedia content items continues with recording the author's verbal explanations in the audio recording and the movement of the mouse cursor 215 is recorded in the event recording of the multimedia item (e.g., periodically determined positions of the mouse cursor). After the author has finished his or her explanations, he or she stops the recording by activating the respective control element 106.

The audio recording and the event recording are stored continuously or after the recording of the multimedia item has terminated. The audio recording and event recording can be stored in a cloud-computing environment or on a remote server. However, the audio recording and event recording can also be stored locally on a data processing device (and transmitted to other data processing devices for replay). The audio recording can be stored in any suitable format (e.g., in an ogg format or in an mp3 format) and the event recording can be stored as a plain text file or as a binary coded file. In this manner, the audio recording and the event recording can be stored in two or more separate files. In this example, the treatment of the slides of the multimedia content item is not discussed for the sake of brevity. However, as described above, the slides can be stored in a separate file or as part of a combined video/audio/image recording.

If a user intends to replay the recorded multimedia item, he/she accesses the multimedia content item including the stored audio and event recording. An application for presenting multimedia content items (e.g., an application as described in U.S. application Ser. No. 13/624,445) can be used to replay the multimedia content item. In some embodiments an application for recording multimedia content items also has the functionality to present multimedia content items. The application for presenting multimedia content items renders the mouse recording synchronized with the audio recording, where a time when a particular cursor position is rendered is determined by comparing the time stamp of the particular event with an elapsed time of the audio recording. In this manner, the mouse recording can be rendered in synchronization with the audio recording. Further details of the replaying of a media recording (e.g., the audio recording in the previous example) and an event recording (e.g., the trace of the mouse cursor in the previous example) are discussed below in connection with FIG. 5.

Figure 3:
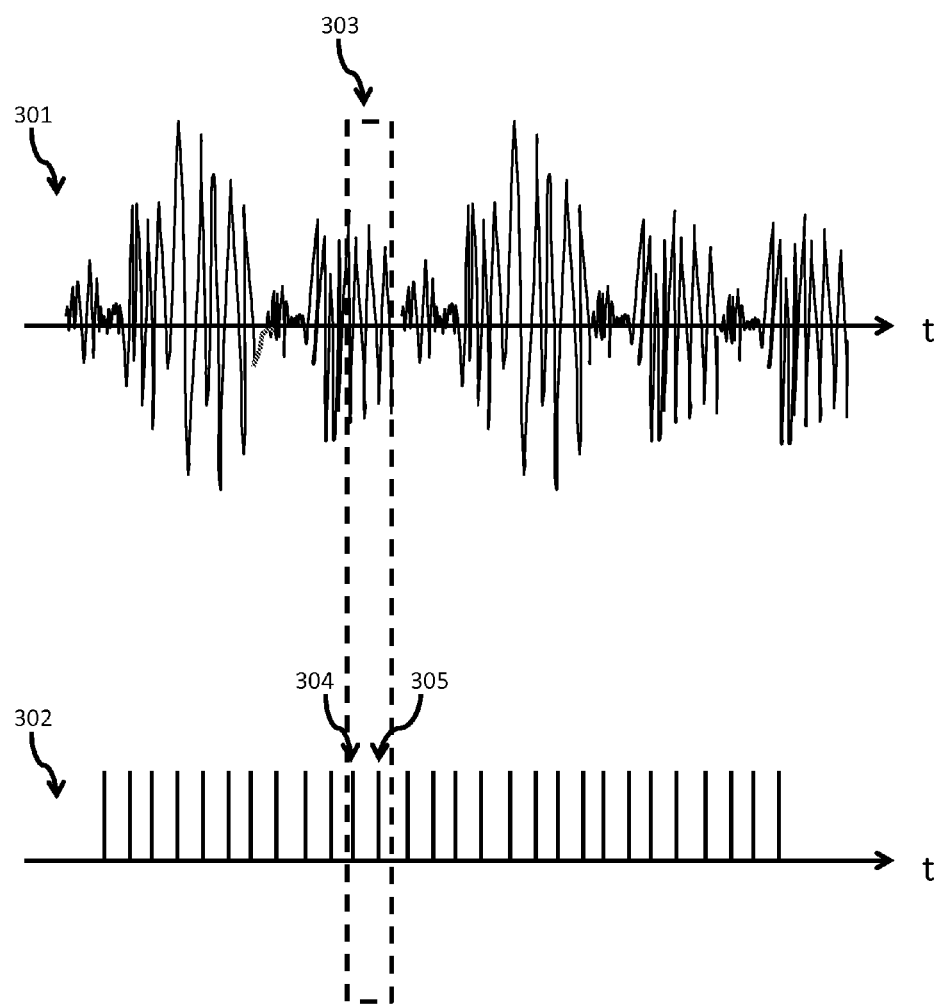
FIG. 3 illustrates graphical representations of an audio recording and an event recording.

FIG. 3 illustrates a graphical representation of an audio recording and an event recording and FIG. 4 illustrates time stamp data and data characterizing events of an event recording. Further aspects of the recording of the event recording will be discussed subsequently in connection with FIG. 3 and FIG. 4. The upper curve 301 of FIG. 3 illustrates an audio recording (e.g. a waveform of the voice of an author of a multimedia content item). The lower curve 302 of FIG. 3 illustrates a corresponding event recording.

In the example event recording of FIG. 3, a position of a pointer device is recorded (approximately) periodically. This can be programmed by setting a software timer (e.g., a "wait command") to a predetermined value. For instance, if a software timer is set in loop and the position of the pointer device is recorded each time the software timer lapses, an approximately periodic recording of the pointer device trace can be achieved. For example, the position of the pointer device can be recorded with a frequency between 0.2/s and 120/s. The curves of FIG. 3 highlight two particular events 304, 305 in the box with the dashed boundary. These events can, e.g., correspond to the pointer device positions of the mouse cursor as depicted in FIG. 1 and FIG. 2.

FIG. 4 shows data encoding an event recording as described herein and further data to illustrate in more detail some of the problems for synchronizing an event recording and a media recording. In the example of FIG. 4, a position of the pointer device has been recorded for an audio recording of 500 ms length. The recording of the pointer device positions are triggered by the lapsing of a software timer (e.g., every 50 ms). The pseudo-code reproduced below implements the above described loop:

```
WHILE recording audio recording
{wait ( 50 ms )
record x position of mouse
record y position of mouse}
```

Thus, the timer is set to lapse every 50 ms what should result in ten (or eleven) recorded positions of the pointer device over the duration of the audio recording of 500 ms length. However, as can be seen in the second column of FIG. 4 including x-y positions of the pointer device, only eight events have been recorded.

The reason for this mismatch lies in the insufficient real time capabilities of most environments the application for recording multimedia content items can be executed in. For example, in browser based applications (e.g., applications written in Javascript) a software timer as described above (and as exemplified in the pseudo-code reproduced above) can be fairly unreliable. On the one hand, each reading of the position of the pointer device itself causes a predetermined delay (e.g., 1 to 2 ms in some applications). In addition, a current state of the computing device can offset the software timer. In particular, high CPU workload or changed CPU workload can lead to offsets of several 100 ms or more (for example, an incoming voice over IP call in the background can introduce a 150 ms delay). These and other factors lead to systematic errors when measuring the time with software timers. Even though the above described factors lead to a systematic underestimation of the "real" time of an event, there are also situations where the "real" time of an event is systematically overestimated. The techniques described here are equally applicable in these situations.

As a consequence of the above described effects, the intended (and possibly stored) recording time of an event (e.g., a position of a pointer device) does not reflect the actual timing of the event relative to an elapsed time media recording. This, in turn, can offset event recording compared to the media recording during replay of the event recording and the media recording. Even though the offset has a comparatively small absolute value in the example of FIG. 4, the relative value compared to the duration of the audio recording is considerable. In addition, the offset might sum up to several seconds fairly rapidly which renders the event recording useless (e.g., the audio recording and the mouse recording are completely out of synchronization when replaying the multimedia content item).

In order to address this issue, the techniques described herein use a system clock of a computer device as reference time source for generating the time stamps of events of the event recording. The third column of FIG. 4 shows the polled system clock values and the fourth column shows the system clock values after a reference time has been subtracted (e.g., the first recorded time stamp). Either or both values can be stored as a time stamp of the events of the event recording. In some embodiments, it can be sufficient to store a time stamp relative to a reference time derived from one of the time stamps of the vent recording, as the "absolute" timing of the events (e.g., relative to Jan. 1, 1970) is not of primary interest. In the embodiment of FIG. 4, the first recorded value is subtracted from all polled system times. However, this is not essential. The obtained system time can also be processed by subtracting any other value. Using these processed time stamps derived from the system time instead of absolute values can reduce the memory required to time stamp an event, as several digits of typical system time formats (e.g., encoding time spans of years, months days) might not be used for usual multimedia content items.

In the embodiment of FIG. 4, the recording of an event is still triggered by a lapse of a software timer. The pseudo-code reproduced below implements this modified loop:

```
WHILE recording audio recording
  {wait ( 50 ms )
  record x position of mouse
  record y position of mouse
  record system time}
```

When comparing the processed system time values in the last column of FIG. 4 with the intended recording times, the offset due to the above described factors can be quantified. At the eighth event, 503 ms have passed but the software timer only has lapsed seven times indicating that 350 ms have passed. Thus, the offset is 153 ms. On the other hand, the total elapsed system time is 503 ms and the duration of the audio recording is 500 ms. This shows that the system time can be used as an accurate timer to time stamp the events of the event recording.

In the example detailed above, a software timer with a fixed period is employed, i.e., events are recorded with a fixed frequency. However, the techniques described here are not limited in this respect. In general, the event recording can include arbitrarily timed events and also event triggered events. In one example, the period of the periodic recording can change with time. In another embodiment, the position of a pointer device can be only recorded if the position of the pointer device changes. In addition or alternatively, an author can interact with the input device in other ways than by moving a pointer. In general, every user interactions with an input device (e.g., clicking a button of a mouse, a keyboard entry, a voice command or gesture) can be an event to be recorded in an event recording. Some examples of these interactions are given above. For instance, the author can zoom in or zoom out in an image, slide or video, change a section of an image, slide or video to be presented, launch an animation to be presented or draw a drawing on the presentation area. In other examples, the author can move forward or backward through the slides of a slideshow. Any of these events can be recorded in an event recording and a time stamp including the system time when the particular event took place can be generated.

In one embodiment, the data set shown in FIG. 4 is modified to account for a large variety of different events related to one or more user interactions with an input device. For example, the data set can include for each event position data indicating a position on the presentation area where the event took place, a time stamp derived from system time, and an tag indicating a type of the event (e.g., zooming in or out, drawing or starting another application). For instance, the event recording can include four columns or rows where each column or row includes data characterizing one event. In one embodiment, each event is characterized by a system time stamp when the vent took place, an x-coordinate of the position of a pointer device when the event took place, a y-coordinate of the position of a pointer device when the event took place, and a tag indicating a type of the event. The tag field can remain empty if the trace of the pointer device is recorded (e.g., a trace of a mouse cursor).

The problems with assigning events an accurate time in the presence to delays and offsets described above is one source of inaccuracies for a synchronized replay of an event recording and a media recording. However, there are additional sources of inaccuracies that can desynchronize a synchronized replay of a media recording and an event recording. Some of these additional problems can also be addressed by the techniques described here.

As described in connection with FIG. 1, an author can start recording a media recording and an event recording in an application for recording multimedia content items by activating a particular control element (e.g., a "start recording button"). Ideally, the recording of the media recording and the event recording would begin at the same point in time. However, this cannot be achieved in different real world systems due to issues which are discussed below in detail. The result of these issues is an offset between the starting time of the recording of the media recording and the event recording. This offset can be as long as several seconds. This starting time offset can be problematic even if the system time is employed to time stamp the events of the event recording. For instance, in the example of FIG. 4 it is assumed that the first event is recorded immediately after the start of the recording of the event recording. Therefore, the time stamp of this first event is "0 ms." However, if there is an offset between the recording of the event recording and the media recording, the "true time" of this first event (and all other events of the event recording) can be offset. This can result in a not synchronized replay of the media recording and the event recording.

There are different reasons causing this offset. On the one hand, some applications for recording multimedia content items do not support parallel processing (e.g., multi-threading). In this situation, the start command for recording the event recording and the start command for recording the media recording are processed sequentially. For instance, Javascript does not allow multi-threading. Typical delays can be between 10 ms and 30 ms. On the other hand, for starting the recording of the media recording in some applications a connection to a remote server has to be established. For instance, a web-browser can provide a flash-based recorder for recording an audio recording. The time it takes to establish the connection to the remote server is typically between 700 and 1200 ms. This mean that offsets of more than one second typically occur which seriously impact synchrony between the media recording and the event recording.

The techniques for recording a media recording and an event recording described here can be modified in the following manner to account for the offset. Where the starting time of recording the media recording and the event recording cannot be reliably aligned, a timing inaccuracy for stopping the recording can be much lower. For instance, the inaccuracy can be between 10 and 20 ms in typical situations. Again, the recording of both recordings can be terminated upon activation of a control element by the author (e.g., in the application for recording multimedia content items described in connection with FIGS. 1 and 2). Thus, the end point of the recording can be used to compensate for the offset between the event recording and the media recording.

In one embodiment, events are recorded with a high frequency. For instance, in the example of FIG. 3 and FIG. 4, a target recording rate is 50/s. In this situation, a last event in the event recording can be used as a reference point. An example algorithm to change a reference time of the time stamps of the event recording with the last recorded event as reference point is described in pseudo-code below:

```
time stamp normalized to end point=time stamp
  raw−(last recorded time stamp−total duration of
  the audio recording)
```

Alternatively or in addition, the event recording can include an event indicating the termination of a recording and this event can be used as a reference time. This even can include the system time at the point in time when the author terminates the recording. This can be advantageous if the events are comparatively sparse, i.e., a last event might be a bad estimate for the end of the recording.

The above described processing of the time stamps can be carried out by the application for recording multimedia content items. Alternatively, the time stamps can be processed by an application for presenting multimedia content items before a particular multimedia content item is replayed. Then, the replay of the multimedia content item can be carried out using the modified time stamps of the events as described in connection with FIG. 5

Figure 5:
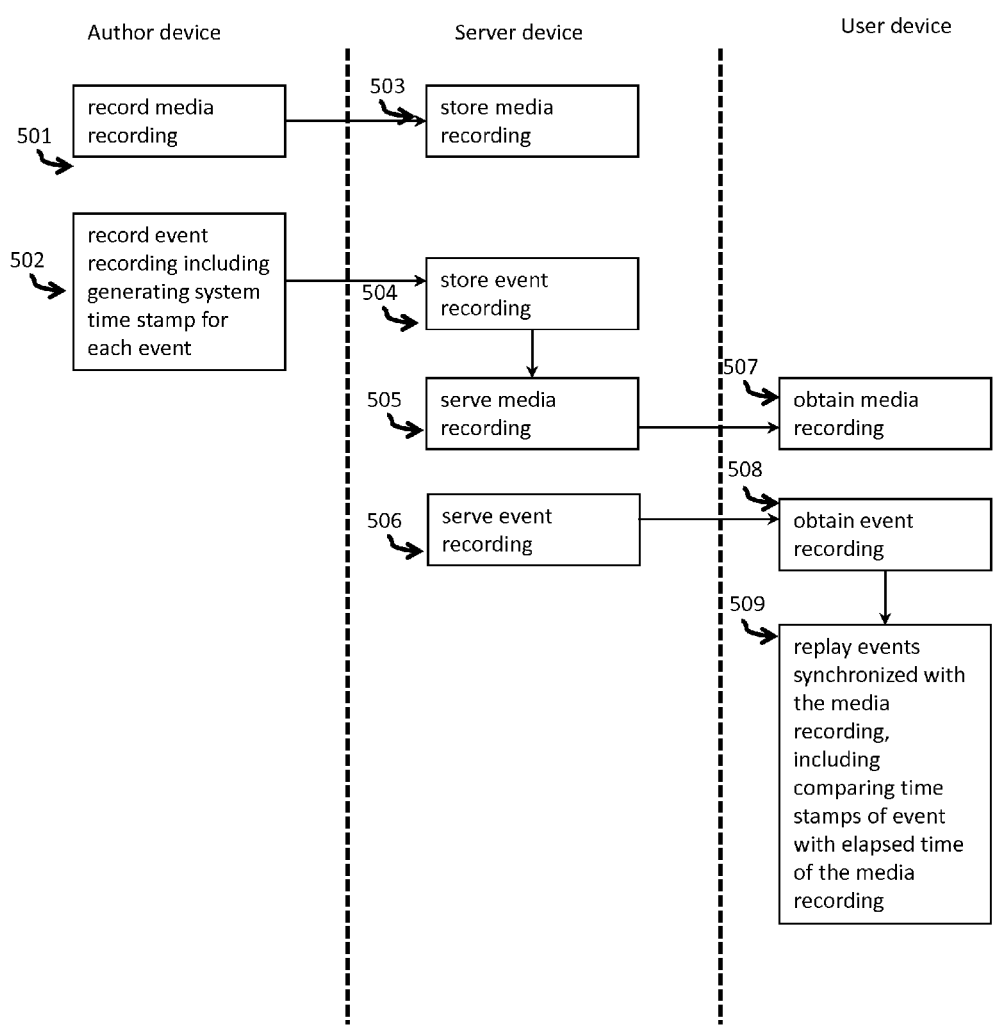
FIG. 5 illustrates a method for simultaneously recording a media recording and an event recording and a method for synchronized replay of a media recording and an event recording.

FIG. 5 illustrates a method for simultaneously recording a media recording and an event recording as discussed in detail above but also a method for synchronized replay of a media recording and an event recording. FIG. 5 illustrates the methods presented here in a client-server network, where the author and the user (consumer) of the multimedia content item use client devices to serve the application for recording multimedia content items and for presenting multimedia content items, respectively. However, as already discussed above, this configuration is not essential for the methods described here. The applications for recording multimedia content items and for presenting multimedia content items can also be executed in other environments.

At an author device, an author can generate a multimedia content item. This process includes at 501 recording a media recording and at 502 recording an event recording including generating a system time stamp for each event. Details of this process have been discussed above in connection with FIG. 1 to FIG. 4. The media recording and the event recording are stored 503, 504 on a server device (e.g., a remote server our in a cloud computing environment).

At a predetermined point in time, a user can request the multimedia content item for replay. The user device opens an application for presentation of multimedia content items (e.g., a web-browser based application). The server device serves the media recording and the event recording 505, 506 to the user device. The user device obtains the media recording and the event recording 507, 508. The user device replays 509 the events of the event recording synchronized with the media recording. In order to achieve a synchronized replay, the user device compares the time stamps of the events with an elapsed time of the media recording. This process will be discussed in more detail subsequently. The operation of obtaining the media and event recordings and the operation of replaying the media and event recordings in a synchronized manner can be performed serially or (at least partially) in parallel.

As shown in connection with FIG. 4, the event recording includes data regarding the type and the timing of a set of events. The timing data includes a time stamp that has been derived from a system clock at the time the respective event has been recorded. The event recording of FIG. 4 encodes the recording of a pointer device (e.g., a mouse cursor) over a presentation area. It includes the periodically recorded position of the pointer device on the presentation area. The method for replaying discussed below is not limited to this example. Rather, other events (for example, the types of events discussed above) can also be replayed by employing the method described below.

The application for presentation of multimedia content items running on the user device replays the audio recording of the multimedia content item. At the same time, slides of a slideshow are displayed by the application for presentation of multimedia content items. As already discussed above, details regarding the recording and storage of the slides have been omitted for the sake of brevity. The slides can be stored separately and served by the server device or stored in a media recording in addition to the audio recording. In the example of FIG. 5, the slides are stored and served separately. During replay of the audio recording, the application for presentation of multimedia content items renders a presentation of a cursor of a pointer device on top of the displayed slides. The time stamps of the event recording are used to synchronize this rendering (e.g., the replay of the events of the event recording in this example) with the audio recording. This can be done in the following manner.

During replay of the audio recording, the application for presenting multimedia content items continuously or periodically monitors the elapsed time of the audio recording. In one embodiment, a current elapsed time of the audio recording can be requested from a browser periodically (e.g., every 5 to 15 ms). The event is replayed by the application for presenting multimedia content items if an absolute value of the difference between the elapsed time of the audio recording minus a time of a time stamp of a particular event is smaller than a predetermined threshold. Instead of requesting a current elapsed time of the audio recording a current system time can also be requested and used as described above to determine when to replay an event. In other embodiments, the application for presenting a multimedia content item continuously or periodically compares the current elapsed time of the audio recording with the time stamps of the events in the event recording. As soon as the elapsed time of the audio recording is equal a particular time stamp, the application for presenting a multimedia content item replays the event associated with the particular time stamp.

If a user skips through a multimedia content item, the application for presenting multimedia content items determines a current elapsed time of the audio recording and scans the event recording for an event with a corresponding time stamp. If there is an event with a corresponding time stamp, the event is replayed. After that the reply continues as described above.

In the embodiment of FIG. 4 and FIG. 5, the application for presenting a multimedia content item renders a representation of a cursor at the position identified in the event recording for the particular event. In this manner, the trace of the cursor of the presentation device is replayed in a synchronized manner. Even though the original recording included delays and offsets compared to the intended timing of the recording of the event recording (e.g., every 50 ms), the replay plays back the event recording with the same inaccuracies. In this manner, a synchronized replay of the media recording and the event recording can be achieved. In this manner, a master clock is derived from the audio recording and during presentation of the multimedia content item, the recording of the author's pointer and/or input device can be synchronized to the master clock.

As used herein, a synchronized replay does not mean that the media recording and the event recording are replayed in perfect synchronization. On the one hand, there still can be residual inaccuracies when time stamping the events based on the system time (in some situations these inaccuracies account for an offset of up to 20 ms). On the other hand, a threshold inaccuracy can be acceptable, where the threshold depends on the particular multimedia content item. However, when using the techniques described here the occurrence of large inaccuracies might be reduced, or the frequency of large inaccuracies might be reduced.

A pseudo-code example of a method for replaying an audio and event recording is reproduced below:

```
start audio playback
set i=1 (first item in the array including the events of the event recording)
do ( as often as you can)
{ if
(system time stamp (i) >= current elapsed audio time )
{render( x(i) and y(i) ) on the screen}
else
{ i=i+1 (jump to the next greater system time value ) }}
```

In the embodiment described above, the elapsed audio time is used as a reference timer as an event is replayed in synchronization if it has a particular timing compared to the audio recording. If there is a video recording the elapsed video time can also be used as a reference timer. In still other embodiments, an elapsed system time of the computer device replaying the multimedia content item can be used as a reference timer. In these embodiments, the application for presenting multimedia content items can continuously or periodically monitor the system time and replay an event if the system time of the computer device equals the time stamp of the respective event.

The application for presenting multimedia content items can be a web-browser based application. For instance, the application can be a flash application. However, the techniques presented here are not limited to web-browser based applications. Rather, application for presenting multimedia content items can also be executed in on-line environments other than web-browser environments and in off-line environments. For instance, the application for presenting multimedia content items could be a program of a mobile device or locally executed on a personal computer.

The application for presenting multimedia content items can be executed on any data processing apparatus ("computer device") described below. For example, the application for presenting multimedia content items can be executed on a mobile device or desktop computer. The data processing apparatus for executing the application for presenting multimedia content items can include a speaker, a display device, or both for replaying the evens recording synchronized with the media recording.

In the previous sections, the system time of a computer device is used to accurately time the events of an event recording to address the above described problems of many environments to reliably keep time. However, in some applications it might be possible to derive an accurate timing from a software timer. In these applications, the methods described above can still be employed. In these embodiments, the application for recording multimedia content items also records an event recording by storing a time stamp associated with each event. In these embodiments, the time stamp is not derived by polling the system time of a computer device but by a software timer. The remaining aspects of the methods for recording and replying multimedia content items described here can remain unchanged.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate physical components or media (e.g., multiple DVDs, disks, or other storage devices).

Audio, video and activity of the pointer and/or input device information has to be synchronized to achieve a satisfying user experience. In one example, a master clock is derived from the audio recording and during presentation of the multimedia content item, the recording of the author's pointer and/or input device and the image or video data are synchronized to the master clock in each frame.

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a monitor, for displaying information to the user and a keyboard and a pointing device, e.g., a mouse or a recordingball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Thus, particular embodiments of the subject matter have been described. Other embodiments are within the scope of the following embodiments and claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

In a first aspect a computer-implemented method for simultaneously recording a media recording and an event recording includes recording a media recording, recording an event recording simultaneously with the media recording, the event recording encoding a plurality of events, wherein an event is related to one or more user interactions with an input device associated with the media recording, wherein recording the event recording includes for each of a plurality of events of the event recording generating data characterizing the particular event, generating a corresponding time stamp for the particular event by polling a system time of a computer device at the time the particular event takes place and providing the data characterizing the particular event and the corresponding time stamp for storage.

In a second aspect according to first aspect the recording of the media recording and the event recording is performed by a web-browser based application.

In a third aspect according to the second aspect the web-browser based application is a flash application.

In a fourth aspect according to any of the preceding aspects the computer device whose system time is polled is a local computer device the media and event recordings are recorded with.

In a fifth aspect according to any of the preceding aspects the media recording and the event recording are stored in a cloud-computing environment.

In a sixth aspect according to any of the preceding aspects the media recording and the event recording are stored on a remote server.

In a seventh aspect according to any of the preceding aspects the one or more user interactions with an input device include movement of a pointer device and the data characterizing the particular event includes position data of the pointer device.

In an eighth aspect according to any of the preceding aspects the one or more user interactions with an input device include triggering the display of content and the data characterizing the particular event includes data characterizing the content.

In a ninth aspect according to any of the preceding aspects the one or more user interactions with an input device include drawing an element in a presentation area and the data characterizing the particular event includes data characterizing the element.

In a tenth aspect according to any of the preceding aspects the one or more user interactions with an input device include zooming in or out in a presentation area and the data characterizing the particular event includes data characterizing zoom operation.

In an eleventh aspect according to any of the preceding aspects the one or more user interactions with an input device include triggering the execution of an application and the data characterizing the particular event includes data characterizing the executed application.

In a twelfth aspect according to any of the preceding aspects the media recording and the event recording are part of a multimedia content item.

In a thirteenth aspect according to any of the preceding aspects the event recording encodes a trace of a pointer device over a presentation field by storing a set of positions of the pointer device.

In a fourteenth aspect according to any of the preceding aspects the event recording comprises determining a number of events to be recorded.

In a fifteenth aspect according to any of the preceding aspects the events are recoded periodically with a predetermined intended frequency.

In a sixteenth aspect according to any of the preceding aspects recording of an event of the event recording is triggered by lapsing of a software timer.

In a seventeenth aspect according to the sixteenth aspect the software timer is configured to lapse periodically.

In an eighteenth aspect according to the sixteenth or seventeenth aspect the software timer is configured to lapse periodically the software timer is configured to lapse periodically with a frequency of between 0.5/s and 120/s.

In a nineteenth aspect according to any of the previous aspects, the method further comprises subtracting a reference time from the polled system times of the time stamps.

In a twentieth aspect according to the nineteenth aspect the reference time is derived from a time stamp of the last recorded event.

In a twenty-first aspect according to the nineteenth or twentieth aspect the reference time is derived from the time stamp of the last recorded event minus a total duration of the audio/video image recording.

In a twenty-second aspect according to any of the preceding aspects the media recording includes an audio recording.

In a twenty-third aspect a method for synchronized replay of a media recording and an event recording, the method comprises obtaining a media recording and a corresponding event recording, the event recording encoding one or more events, wherein an event characterizes one or more user interactions with an input device, wherein the event recording comprises for each of a plurality of events data characterizing the particular event a corresponding time stamp for the particular event generated by polling a system time of a computer device at the time the particular event took place, wherein the method further comprises replaying the media recording and replaying the events synchronized with the media recording, wherein a time when a particular event is replayed is determined by comparing the time stamp of the particular event with an elapsed time of the media recording.

In a twenty-fourth aspect according to the twenty-third aspect comparing the time stamp of the particular event with an elapsed time of the media recording includes polling a system time of a computer device the replay takes place on.

In a twenty-fifth aspect according to the twenty-third or twenty-fourth aspect a particular event is replayed if a difference between an elapsed time of the media recording and a time stamp of the particular event is less than a predetermined threshold.

In a twenty-sixth aspect a computer-implemented method for synchronized replay of an media recording and an event recording comprises obtaining an media recording and a corresponding event recording, the event recording encoding one or more events, wherein an event characterizes one or more user interactions with an input device, wherein the event recording comprises for each of a plurality of events data characterizing the particular event a corresponding time stamp for the particular event generated by polling a system time of a computer device at the time the particular event took place, wherein the method further comprises generating modified time stamps by aligning end points of the media recording and the even recording to determine an offset between the media recording and the even recording and correcting the time stamps by the determined offset.

In a twenty-seventh aspect according to the twenty-sixth aspect events that took place before the recording of the media recording started are discarded.

In a twenty-eighth aspect according to the twenty-sixth aspect or the twenty-seventh aspect correcting the time stamps including subtracting a system time of the last event from the system time of the particular event and adding a total duration of the recorded media recording.

In a twenty-ninth aspect computer device for simultaneously recording a media recording and an event recording, the method comprises a microphone, a camera, or both for recording a media recording, an input device, a processor to execute an application for recording multimedia content items and a computer readable storage medium having instructions stored thereon which when executed cause the computer device to carry out anyone of the methods of the first to twenty-second aspects.

In a thirteenth aspect a computer readable storage medium has instructions stored thereon which when executed cause the computer device to carry out anyone of the method In a thirty-first aspect a computer device for synchronized replay of a media recording and an event recording comprises a speaker, a display device, or both for replaying the evens recording synchronized with the media recording, a processor to execute an application for replaying multimedia content items and a computer readable storage medium having instructions stored thereon which when executed cause the computer device to carry out anyone of the methods of the twenty-third to twenty-sixth aspects.

In a thirty-second aspect a computer readable storage medium having instructions stored thereon which when executed cause the computer device to carry out anyone of the methods of the twenty-third to twenty-sixth aspects.

What is claimed is:

1. A computer-implemented method for simultaneously recording a media recording and an event recording, the method comprising:
   recording a media recording;
   recording an event recording simultaneously with the media recording, the event recording encoding a plurality of events,
   wherein an event is related to one or more user interactions with an input device associated with the media recording;
   wherein recording the event recording comprises for each of a plurality of events of the event recording:
   generating data characterizing the particular event;
   generating a corresponding time stamp for the particular event by polling a system time of a computer device at the time the particular event takes place;
   generating a modified time stamp by:
      aligning end points of the media recording and the event recording to determine an offset between the media recording and the event recording; and
      correcting the time stamp by the determined offset;
      wherein an event that took place before the recording of the media recording started is automatically discarded;
   providing the data characterizing the particular event and the corresponding modified time stamp for storage;
   wherein the event recording encodes a trace of a pointer device over a presentation field by storing a set of positions of the pointer device.

2. The computer-implemented method of claim 1, wherein the recording of the media recording and the event recording is performed by a web-browser based application.

3. The computer-implemented method of claim 2, wherein the web-browser based application is a flash application.

4. The computer-implemented method of claim 1, wherein the computer device whose system time is polled is a local computer device the media and event recordings are recorded with.

5. The computer-implemented method of claim 1, wherein the media recording and the event recording are stored in a cloud-computing environment.

6. The computer-implemented method of claim 1, wherein the media recording and the event recording are stored on a remote server.

7. The computer-implemented method of claim 1, wherein the one or more user interactions with an input device include movement of a pointer device and the data characterizing the particular event includes position data of the pointer device.

8. The computer-implemented method of claim 1, wherein the one or more user interactions with an input device include triggering the display of content and the data characterizing the particular event includes data characterizing the content.

9. The computer-implemented method of claim 1, wherein the one or more user interactions with an input device include drawing an element in a presentation area and the data characterizing the particular event includes data characterizing the element.

10. The computer-implemented method of claim 1, wherein the one or more user interactions with an input device include zooming in or out in a presentation area and the data characterizing the particular event includes data characterizing zoom operation.

11. The computer-implemented method of claim 1, wherein the one or more user interactions with an input device include triggering the execution of an application and the data characterizing the particular event includes data characterizing the executed application.

12. The computer-implemented method of claim 1, wherein the media recording and the event recording are part of a multimedia content item.

13. The computer-implemented method of claim 1, wherein the event recording comprises determining a number of events to be recorded.

14. The computer-implemented method of claim 1, wherein the events are recoded periodically with a predetermined intended frequency.

15. A computer-implemented method for simultaneously recording a media recording and an event recording, the method comprising:
   recording a media recording;
   recording an event recording simultaneously with the media recording, the event recording encoding a plurality of events,
   wherein an event is related to one or more user interactions with an input device associated with the media recording;
   wherein recording the event recording comprises for each of a plurality of events of the event recording:
   generating data characterizing the particular event;
   generating a corresponding time stamp for the particular event by polling a system time of a computer device at the time the particular event takes place;
   providing the data characterizing the particular event and the corresponding time stamp for storage;
   wherein recording of an event of the event recording is triggered by lapsing of a software timer;
   wherein the software timer is configured to lapse periodically, wherein the software timer is configured to lapse periodically with a frequency of between a first frequency value and a second frequency value that is larger than the first frequency value.

16. The computer-implemented method of claim 15, wherein the software timer is configured to lapse periodically with a frequency of between 0.5/s and 120/s.

17. A computer-implemented method for synchronized replay of a media recording and an event recording, the method comprising:
   obtaining a media recording and a corresponding event recording, the event recording encoding one or more events, wherein an event characterizes one or more user interactions with an input device;
   wherein the event recording comprises for each of a plurality of events:
   data characterizing the particular event;
   a corresponding time stamp for the particular event generated by polling a system time of a computer device at the time the particular event took place;
   replaying the media recording;
   replaying the events synchronized with the media recording, wherein a time when a particular event is replayed is determined by comparing the time stamp of the particular event with an elapsed time of the media recording;
   wherein a particular event is replayed if a difference between an elapsed time of the media recording and a time stamp of the particular event is less than a predetermined threshold.

18. The computer-implemented method of claim 17, wherein comparing the time stamp of the particular event with an elapsed time of the media recording includes polling a system time of a computer device the replay takes place on.

19. A computer-implemented method for synchronized replay of an media recording and an event recording, the method comprising:
   obtaining an media recording and a corresponding event recording, the event recording encoding one or more events, wherein an event characterizes one or more user interactions with an input device;
   wherein the event recording comprises for each of a plurality of events:
   data characterizing the particular event;
   a corresponding time stamp for the particular event generated by polling a system time of a computer device at the time the particular event took place;
   generating modified time stamps by:
   aligning end points of the media recording and the event recording to determine an offset between the media recording and the event recording; and
   correcting the time stamps by the determined offset;
   wherein events that took place before the recording of the media recording started are discarded.

20. A computer-implemented method for synchronized replay of an media recording and an event recording, the method comprising:
   obtaining an media recording and a corresponding event recording, the event recording encoding one or more events, wherein an event characterizes one or more user interactions with an input device;
   wherein the event recording comprises for each of a plurality of events:
   data characterizing the particular event;

a corresponding time stamp for the particular event generated by polling a system time of a computer device at the time the particular event took place;

generating modified time stamps by:

aligning end points of the media recording and the event recording to determine an offset between the media recording and the event recording; and correcting the time stamps by the determined offset;

wherein correcting the time stamps including subtracting a system time of the last event from the system time of the particular event and adding a total duration of the recorded media recording.

21. A computer device for simultaneously recording a media recording and an event recording, the method, the device comprising:

a microphone, a camera, or both for recording a media recording;

an input device;

a processor to execute an application for recording multimedia content items; and a computer readable storage medium having instructions stored thereon which when executed by a computer device cause the computer device to:

recording a media recording using the microphone, the camera, or both;

recording an event recording simultaneously with the media recording, the event recording encoding a plurality of events, wherein an event is related to one or more user interactions with the input device associated with the media recording;

wherein recording the event recording comprises for each of a plurality of events of the event recording:

generating data characterizing the particular event;

generating a corresponding time stamp for the particular event by polling a system time of the computer device at the time the particular event takes place;

generating a modified time stamp by:

aligning end points of the media recording and the event recording to determine an offset between the media recording and the event recording; and correcting the time stamp by the determined offset;

wherein an event that took place before the recording of the media recording started is automatically discarded;

providing the data characterizing the particular event and the corresponding modified time stamp for storage, wherein the event recording encodes a trace of a pointer device over a presentation field by storing a set of positions of the pointer device.

22. A computer device for synchronized replay of a media recording and an event recording, the device comprising:

a speaker, a display device, or both for replaying the evens recording synchronized with the media recording;

a processor to execute an application for replaying multimedia content items; and a computer readable storage medium having instructions stored thereon which when executed by a computer device cause the computer device to obtain a media recording and a corresponding event recording, the event recording encoding one or more events, wherein an event characterizes one or more user interactions with an input device;

wherein the event recording comprises for each of a plurality of events:

data characterizing the particular event;

a corresponding time stamp for the particular event generated by polling a system time of a computer device at the time the particular event took place;

replay the media recording;

replay the events synchronized with the media recording, wherein a time when a particular event is replayed is determined by comparing the time stamp of the particular event with an elapsed time of the media recording wherein a particular event is replayed if a difference between an elapsed time of the media recording and a time stamp of the particular event is less than a predetermined threshold.

23. A non-transitory computer readable storage medium having instructions stored thereon which when executed by a computer device cause the computer device to:

obtain a media recording and a corresponding event recording, the event recording encoding one or more events, wherein an event characterizes one or more user interactions with an input device;

wherein the event recording comprises for each of a plurality of events:

data characterizing the particular event;

a corresponding time stamp for the particular event generated by polling a system time of a computer device at the time the particular event took place;

replay the media recording;

replay the events synchronized with the media recording, wherein a time when a particular event is replayed is determined by comparing the time stamp of the particular event with an elapsed time of the media recording wherein a particular event is replayed if a difference between an elapsed time of the media recording and a time stamp of the particular event is less than a predetermined threshold.

\* \* \* \* \*